(No Model.)
W. H. WHEELER.
PUMP PISTON.
No. 349,830. Patented Sept. 28, 1886.
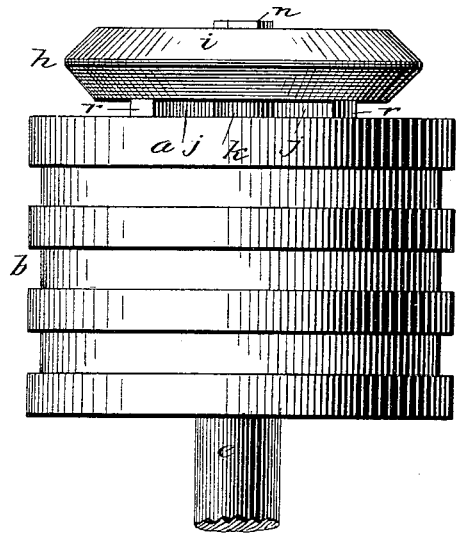
Fig. 1.
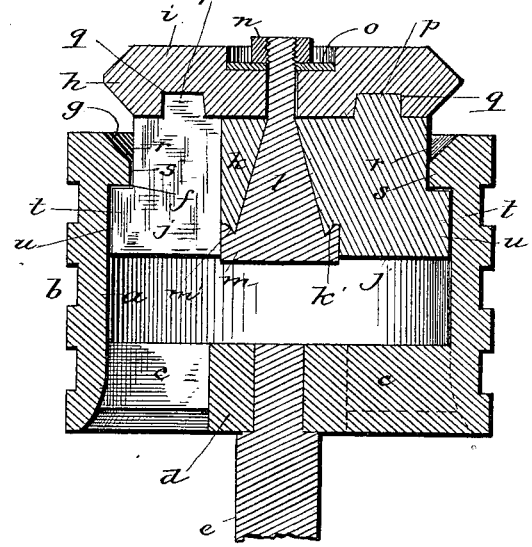
Fig. 2.
Fig. 3.
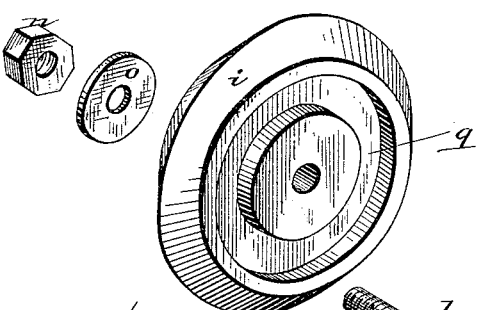
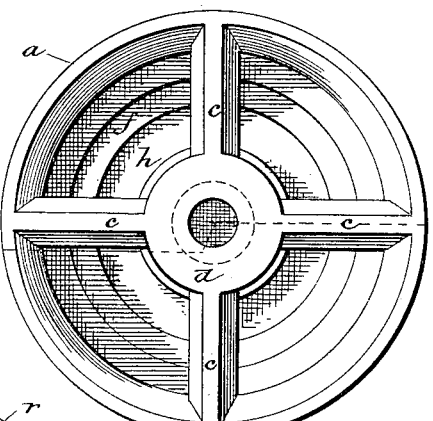
Fig. 4.
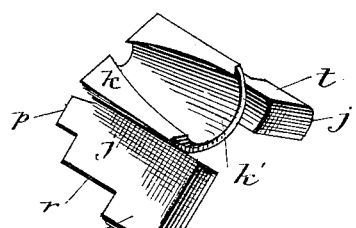
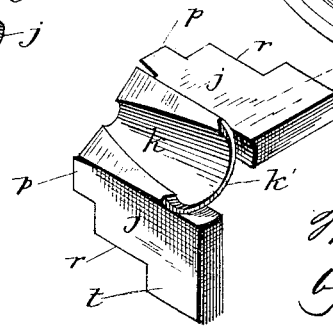
WITNESSES
C. H. Ourand.
Harry Y. Davis.
INVENTOR
William H. Wheeler,
by W. H. Finerel
his Attorney.

UNITED STATES PATENT OFFICE.

WILLIAM H. WHEELER, OF YORK, PENNSYLVANIA, ASSIGNOR OF ONE-HALF TO GEORGE W. S. LOUCKS, OF SAME PLACE.

PUMP-PISTON.

SPECIFICATION forming part of Letters Patent No. 349,830, dated September 28, 1886.

Application filed March 30, 1886. Serial No. 197,168. (No model.)

*To all whom it may concern:*

Be it known that I, WILLIAM H. WHEELER, a citizen of the United States, residing at York, in the county of York and State of Pennsylvania, have invented certain new and useful Improvements in Pump-Pistons, of which the following is a full, clear, and exact description.

My invention is designed, primarily, to fulfill the conditions required of a piston in pumps for ice-machines, although it is applicable to pumps generally.

The invention consists in the peculiar construction, arrangement, and mode of operation of a valve in a valved piston, as I will now proceed to particularly set forth and claim.

In the accompanying drawings, in the several figures of which like parts are similarly designated, Figure 1 is a side elevation of my piston with the valve open. Fig. 2 is a vertical section and partial elevation of the same. Fig. 3 is a perspective view of the dismembered valve. Fig. 4 is a bottom view.

The piston proper is a tubular shell, $a$, adapted to receive packing in circumferential cavities $b$ on its exterior surface, and the bottom of this shell is made with arms $c$, meeting centrally in a hub, $d$, to which the piston-rod $e$ is suitably affixed in any approved immovable and permanent manner. The upper end of the shell is provided with an internally-projecting lip, $f$, and a suitable valve-seat, $g$.

The valve $h$ is composed of a disk, $i$, of metal or other substance, fitted to its seat, and provided with a series of wings or guides, $j$, to which it is detachably connected in substantially the following manner, namely: I prefer to use four guides, and they are connected in pairs to a half-hub, $k$, the opening in which half-hubs, when the latter are joined face to face, is tapering or conical to receive a tapering or conical bolt, $l$, having a laterally-extended or flanged head, $m$, into a groove, $m'$, in which head the tongues $k'$ on the lower ends of the halves of the hub are received, and by which they and their attached guides are supported. The bolt $l$ projects through a central opening in the disk $i$, and is threaded to receive a nut, $n$, between which and the disk a washer, $o$, may be interposed, the nut serving to draw up the headed bolt, and with it clamp the guides to the disk. These guides have projections $p$, which enter holes or an annular recess, $q$, in the under side of the disk, to make a more perfect union with the same, and to guard against lateral displacement or play. The faces $r$ of the guides work against the vertical edge $s$ of the lip $f$, and said faces terminate in right-angled projections $t$, which engage the lower face of the lip to limit the upward movement of the valve, the faces $u$ of said projections working against the inner surface of the shell.

To apply my valve, so constructed, to the shell, the bolt is first placed therein, and may rest upon the hub $d$ as a temporary support. The guides are then successively applied to the bolt by lateral displacement or side tipping of the bolt and guides previously entered until all are in place, with the projections $t$ under the lips $f$. The disk is then applied to the bolt and guides and the washer and nut put in place. The conical bolt and its nut insure a tight fit of the parts.

It will be seen that in my piston the valve is wholly free from and unconnected with the piston-rod, and hence is not liable to disarrangement by the motion of the piston-rod. The largest possible opening is given to the piston-valve, also, by this construction, although as is obvious, the construction is such that said opening may be readily conformed to the requirements of the pump.

The ready detachability and dismemberment of my valve I esteem valuable points in manufacturing and for repairs.

I do not limit my invention to making the guides in pairs, for, obviously, each may be independent of the other, though for the sake of reducing the number of separate parts I prefer to make them in pairs, as shown.

What I claim is—

1. A hollow piston having a rigidly-attached stem, and provided with an inwardly-projecting lip, combined with a piston-valve movable independently of the piston, and comprising a disk, a series of guides having projections to engage said lip to connect the disk with the piston, and a bolt connecting the guides and disk, substantially as described.

2. A piston-valve comprising a disk, a series of guides having meeting faces, forming an internally-tapered hub, and a correspondingly-tapered bolt engaging said guides by and through their hub, and also engaging the disk to unite disk and guides, substantially as described.

3. The combination of a hollow piston having an internal lip and a valve-seat with a valve comprising a disk fitted to said seat, and a series of separable guides connected to said disk and having projections on their inner ends to engage said lip to both guide and limit the movement of said disk with respect to its seat, and a bolt for connecting the disk and guides and retaining the valve in the piston, substantially as described.

4. The disk provided with a recess on its under side, a series of guides having projections to enter said recess, and also tongues to enter a groove in a bolt, combined with said bolt, substantially as described.

In testimony whereof I have hereunto set my hand this 29th day of March, A. D. 1886.

WILLIAM H. WHEELER.

Witnesses:
ELIAS STOMBAUGH,
LOUIS STRAYER.